UNITED STATES PATENT OFFICE 2,431,075

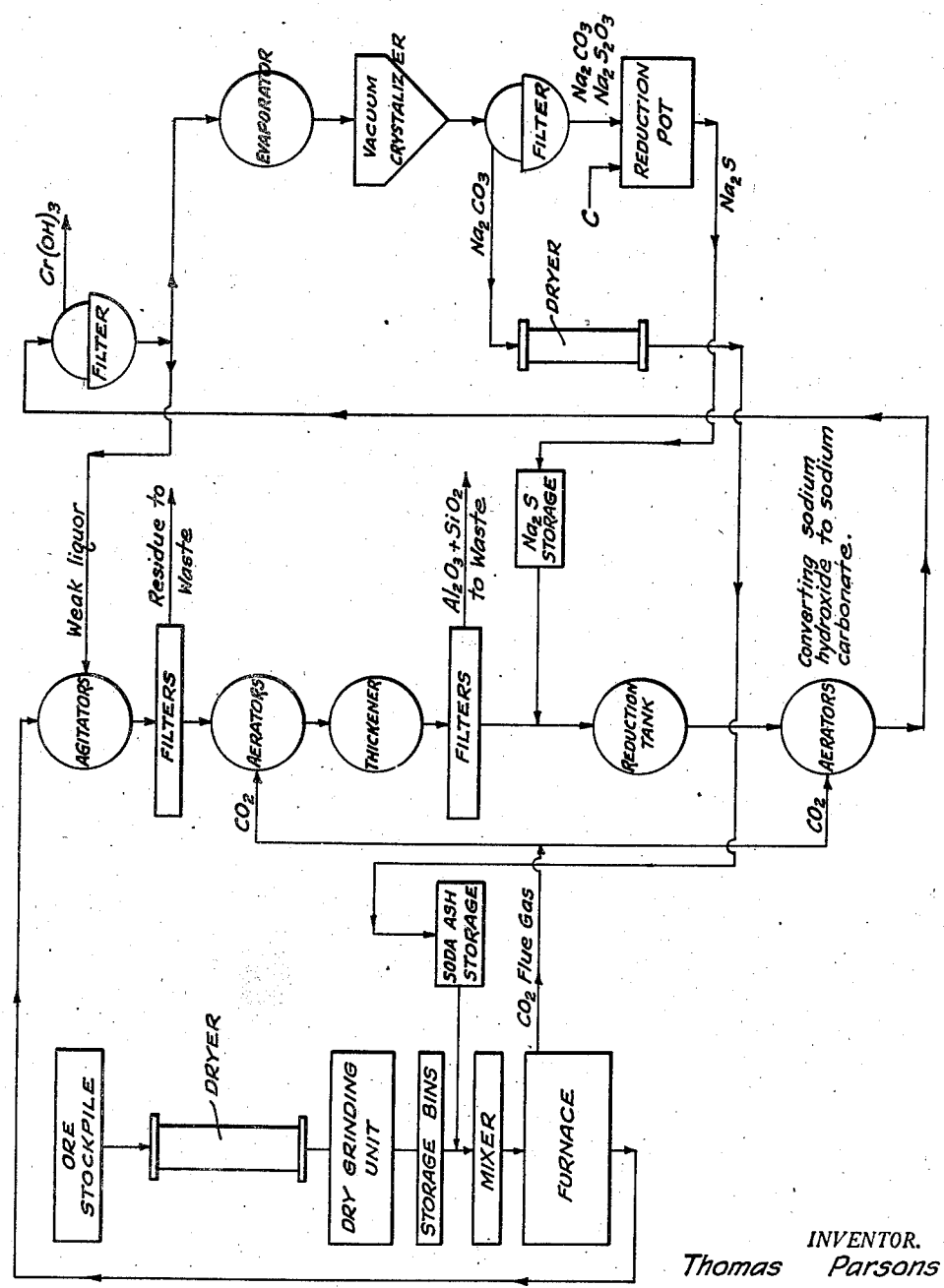

PRODUCTION OF CHROMIUM HYDROXIDE

Thomas Parsons, Oakland, Calif., assignor to Pacific Bridge Company, a corporation of Delaware Application April 2, 1945, Serial No. 586,235

7 Claims. (Cl. 23—145)

This invention relates to a process for the production of a material designated for convenience as chromium hydroxide particularly from low grade chrome ores by an economical process.

Present metallurgical utilization of chrome metal is largely dependent upon ferro-chromium derived from iron chrome ores having a sufficiently high chromium content. For many metallurgical uses, the addition of chromium metal alone is desirable, ferro-chromium being unsuitable. The process of the present invention enables chrome metal to be produced in a substantially pure form. Further, the process of this invention enables chromium to be recovered as chromium hydroxide or as the metal, particularly from ores unsuited to ferro-chromium production because the iron to chromium ratio is too large or because the chrome content is too low.

The Bureau of Mines (Report of Investigation 3600, December 1941) has heretofore conducted an experimental operation in which an aqueous solution of sodium chromate was treated with sulphur dioxide to reduce the hexavalent chromium present to trivalent chromium, the solution being thereafter concentrated by evaporation to remove water and cooled to precipitate sodium sulphate decahydrate which was removed. The remaining solution was then treated to convert the remaining sulphites to sulphates. The solution is then subjected to electrolysis, chromium plating out at the cathode and sulphuric acid forming at the anode.

It will be obvious that this operation has numerous disadvantages. For example, the sodium salt used in the roasting process to form the sodium chromate is finally converted to sodium sulphate and becomes a waste product. The use of sulphur dioxide as a reducing agent results in the additional formation of sulphate which becomes a further waste product. The anolyte produced in the electrolytic cell is essential sulphuric acid; it is removed as a waste product from the system.

I have discovered that the production of chromium as chrome metal from chromium hydroxide or chromium oxide by various methods is feasible and is economically sound providing both the alkali and the material used to form the trivalent chromium from hexavalent chromium are recovered and utilized in the process. This I have found can be successfully accomplished and a cyclic process provided if a sodium chromate solution is treated with sufficient sodium sulphide to form a precipitate of chromium hydroxide. This can then be recovered and used as such or can be converted to the oxide or to a chromium chloride or to chrome metal. The step involved can be represented by the following:

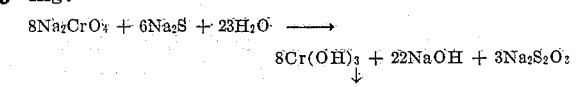

The solution in which the chromic hydroxide precipitate is present also contains sodium hydroxide and sodium thiosulphate. This solution is blown with carbon dioxide to convert the sodium hydroxide to carbonate. The chromium hydroxide precipitate is then removed by filtration; the sodium carbonate and the sodium thiosulphate are recovered by fractional crystallization, the carbonate being dried and sent back to the roasting cycle for re-use to form additional chromate.

The chromium hydroxide precipitate is of a gelatinous nature. By carbonating it, the precipitate is converted into a granular one which filters readily. Also, it can be washed on the filter to rid it of occluded salts, particularly of those containing sulphur. This is of material advantage since a pure material, free of sulphur and suitable for various uses is thus made available. Gelatinous chromic hydroxide holds a goodly percentage of occluded salts and the sulphur content of such a precipitate is usually relatively high.

The sulphur present in the thiosulphate can be recovered also, the crystallized thiosulphate being mixed with the required quantity of carbon and then treated in a reduction pot to form sodium sulphide, the reaction involved being represented as follows:

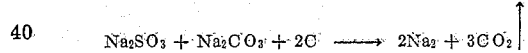

While in the foregoing I have discussed chromic hydroxide and have written the formula, $Cr(OH)_3$, as representing the composition of the precipitate, I am not sure that the precipitate is only a simple hydroxide. It may well be a hydrated oxide, $Cr_2O_3.nH_2O$. The precipitate ages and becomes more difficult to dissolve in a strong acid, particularly if it is permitted to stand at an elevated atmospheric temperature. However, in other ways, it appears to be an hydroxide and I will therefore deal with it herein as such.

The formation of the gelatinous precipitate is apparently due to the presence of the sodium hydroxide and it may be that the precipitate is really a complex of the two. In support of this I have observed that if one washed such a precipitate thoroughly, even then very considerable percentages of sodium hydroxide remain, as much as 15 per cent on the weight of chromium oxide. I have found that the gelatinous precipitate can be converted to a granular form if one converts the sodium hydroxide to a suitable salt such as sodium carbonate. This is easily done by carbonating the solution, the carbonate formed being recovered and employed in the process. One can remove the caustic by conversion to a nitrate, chloride, sulphite, phosphate acetate, tartrate, the corresponding acid or acid salt being added. However, carbonation is much easier, cheaper and provides a material which can be used again in the process.

The inherent advantages of this operation are many, for one can recover the soda utilized in the process as well as the sulphur. A very distinct advantage, however, is the fact that the roasting operation and the subsequent use of the hydroxide need not be conducted in immediate association with one another, for the chromic hydroxide can be utilized wherever one wishes. Therefore, the roasting plant can be in one location and the chromic hydroxide being transported to another plant as such for use or conversion, as desired.

There are various sources of chromium, some containing a relatively large chrome content. Other materials, such as beach sands, are low in chrome. Heretofore, the low grade sources have been largely neglected because it was considered uneconomical to recover their chrome content. The process of the present invention enables any chrome containing ore to be treated and the chrome content recovered.

Since the process is a cyclic one, it can be practised at the site of the ore body. This makes unnecessary a daily supply of ore or reagents from an outside source. Since the ore bodies are usually in places to which transport is difficult and costly, a cyclic process enables the body to be exploited without importation of other than those relatively small quantities of reagents necessary to make up process losses.

The recovery of chromium from chrome ores generally includes formation of sodium chromate, the ore being roasted with soda ash or sodium hydroxide and lime, the presence of the latter having heretofore usually been considered essential. I have discovered that chrome ores can be roasted to form sodium chromate without the use of lime. This is of advantage for if one eliminates lime, a truly cyclic process is made available and one can process beach sand or other chrome ores at their site by a cyclic process and daily transport of large quantities of reagent lime is not a process requirement, it only being necessary, as I have mentioned, to supply those quantities of reagents required to replenish process losses, obviously small quantities. One can obviate the use of lime in either or both of two ways which I will now describe.

1. In the roasting of low grade ores, containing 15 to 25 per cent of chromium as $Cr_2O_3$ in the ore fed to the furnace, the other constituents present such as magnetite, ilmenite and nonsiliceous minerals, when ground to sufficient fineness, (usually all through a 200 mesh screen) act as a sponge, as does lime, holding the sodium chromate formed in the fused mass. As one exceeds a chrome content of about 25 per cent, this action is no longer sufficient to absorb all the liquid material. The mass becomes wet and the rate of conversion is lowered as air penetration is hindered.

2. In observing the roasting of chrome ores of different grades, I discovered that the liquified sodium chromate and sodium carbonate tended to drain off the roast and was either lost or else attacked the furnace lining. $Na_2CrO_4$ and $Na_2CO_3$ form low melting eutectics which may run off as a liquid; these eutectics have a melting point well below that of either the chromate or carbonate. By using a roasting furnace impervious to sodium chromate and sodium carbonate, I have found the chromate could be retained. To accomplish this one should employ a furnace impervious to the liquid sodium chromate. If one uses a rotary kiln or other furnace lined with a refractory, the lining should be impervious to the chromate. In a Herreshoff or like furnace, the roasting chambers can be lined with a metal which is impervious to the chromate or which is not attacked too rapidly by the chromate. This operation is particularly feasible with low grade chrome ores.

It is in general the broad object of the present invention to provide a process enabling oxidic chrome ores to be processed economically to produce chrome metal.

Another object of the present invention is to provide a novel process for the production of chromium hydroxide from an oxidic chrome ore.

A further object is to provide a non-alkaline earth chrome ore roast.

An additional object of the invention is to provide a truly cyclic process for producing chromic hydroxide from a chrome ore.

An additional object is to provide a process for evaluating low grade chrome ores with respect to their chrome content.

An additional object is to provide a process enabling a relatively pure chromic hydroxide precipitate to be produced.

The invention includes other objects and features of advantage, some of which, together with the foregoing, will appear hereinafter wherein further details of the process of the present invention are disclosed.

The drawing accompanying and forming a part hereof is a flow sheet showing a complete operation as successfully practiced upon an oxidic chrome ore. As there appears, an ore, after being concentrated and having certain components such as gold and platinum removed, is placed on a stock pile from which it is taken and passed through a dryer in which the ore is dried to place it in a suitable condition for grinding. The dry ore is then ground and held in storage, being subsequently mixed with sodium carbonate or other suitable alkali. One can use a mixture of alkali metal and alkaline earth metal salts, as is disclosed in the Maier application Serial Number 548,511 and Patent No. 2,394,793, both filed August 7, 1944, but this is not necessary and I prefer to use a lime free roast, thereby avoiding the expense of this reagent and certain disadvantages attendant upon its use.

Subsequently, the mixture is roasted to convert the oxidic ore to a chromate, preferably in a furnace confining the chromate or chromate-carbonate eutectic as I have described. The carbon dioxide flue gas produced in the roasting furnace is taken off and used subsequently in the process.

The production of sodium chromate can be by the steps I have outlined or by any other desired process. In any case the roast product is placed in an agitator vessel together with a weak liquor previously derived in the operation from the sodium carbonate-sodium thiosulphate separation. Any solids remaining undissolved are removed on a filter. If lime is used in the roast, it forms calcium hydroxide or calcium sulphate which are also removed at this point on the filter. The use of lime in the roast does not interfere with the cyclic nature of the process.

The solution is then treated with carbon dioxide or flue gas in an aerator to effect the separation of aluminum oxide and silicon dioxide, the aerated liquor being thickened and subsequently filtered to remove these. The remaining liquor is then treated with sodium sulphide in the stoichiometric quantity required to effect complete precipitation of the chromium present as chromium hydroxide. This precipitate is of a gelatinous nature. It is then treated to render it granular so it can be filtered and washed.

In accordance with this invention, the solution containing the chromium hydroxide precipitate is then treated with additional carbon dioxide or flue gas to convert the sodium hydroxide present to sodium carbonate, the liquor then being sent to a filter to remove the chromium hydroxide. By converting the sodium hydroxide to carbonate, the extent of occlusion of the caustic by the precipitate is reduced. The precipitate becomes granular instead of gelatinous and is much easier to filter and wash. This enables the precipitate to be washed free of all but a trace of sulphur compounds.

The filtrate is sent in part to a crystallizer where the sodium thiosulphate and sodium carbonate are crystallized and removed; another portion, particularly the wash water, is returned as the weak liquor to the leach operation. The liquor to the evaporator is concentrated and then passed to a vacuum crystallizer to crystallize sodium carbonate which is used to replenish the soda ash supply in the chromate formation. The sodium carbonate crystals are removed on a filter; the filtrate, containing sodium carbonate and sodium thiosulphate, is fed as a heavy slurry to a reduction pot. Sufficient carbon is added to complete the sulphur recovery as sodium sulphide. At first, the slurry is dried, being heated only to remove water in the open pot. When dried, the pot is covered and the temperature raised to about 600° C. to form the sodium sulphide. Additional soda ash or sulphur can be added as required.

To illustrate a specific practice conducted in accordance with the present invention, a Crescent City beach sand concentrate was calcined to produce a sodium chromate containing calcined product. The sand was of the following composition:

| | Per cent |
|---|---|
| Cr2O3 | 18.43 |
| TiO2 | 9.34 |
| ZrO2 | 1.68 |
| Al2O3 | 8.52 |
| SiO2 | 5.60 |
| Fe | 31.95 |

The sand was mixed with soda ash in the proportion of 733 pounds of ash to 2,000 pounds of sand. The lime was not employed; none being required because the other constituents acted as a sponge in the finely ground ore. It was then calcined in a furnace having an impervious hearth, a Herreshoff furnace having metal plates defining the roasting zone being employed. As I have indicated, lime is unnecessary because the other constituents present act when finely ground as a sponge for the chromate. In addition, the impervious furnace roasting zone confines the chromate or eutectics, preventing its loss. This latter effect, that of the closed hearth, is applicable to all chrome ores suitable for chromate manufacture. The former effect, that of the ore constituents acting as a sponge, is only available when the chrome content is low, below 25 per cent and the ore is finely ground.

Seven hundred kilograms of the roast were then leached with 1,200 liters of water, the resulting solution containing 77.8 grams of sodium chromate per liter, sodium carbonate, and a small quantity of alumina and of silica. This solution was then treated with carbon dioxide to remove the latter constituents, after which it was filtered. The solution was then treated with sodium sulphide sufficient in amount to precipitate completely the chromium as chromic hydroxide. The solution was then carbonated, the hydroxide was then filtered off and recovered with a substantially stoichiometric yield; the carbonation was sufficient to convert the caustic to carbonate. The hydroxide can be filtered prior to carbonation but this is not preferred.

The sodium sulphide reduction reaction takes place in two stages, as follows:

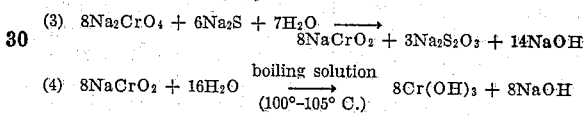

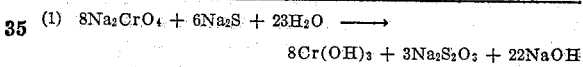

(1) $8Na_2CrO_4 + 6Na_2S + 23H_2O \longrightarrow$
$8Cr(OH)_3 + 3Na_2S_2O_3 + 22NaOH$ As indicated, the reaction goes to completion and the effectiveness of the sodium sulphide added in the presence of excess chromate is stoichiometric.

Instead of using the sodium salts one can, of course, use the potassium salts. However, these are usually too expensive for an operation of this type. The ammonium radical, some times considered as an equivalent alkali metal, is not useful.

The recovered precipitate can be used as such as a source of oxide, being heated to about 1000° C. to drive off water. This oxide can be reduced with hydrogen to chrome metal, reacted with chlorine in a reducing atmosphere to form $CrCl_2$ or $CrCl_3$ which may then be reduced with hydrogen. The precipitate is soluble in sulphuric acid; it may therefore be fed to a cell as chromic sulphate and electrolyzed in such solution to form chrome metal.

I claim:

1. A process for producing sodium chromate comprising roasting a chrome ore with sodium carbonate to form sodium chromate, forming an aqueous solution of said sodium chromate, adding sufficient sodium sulphide to said aqueous solution of said chromate to precipitate chromium hydroxide substantially completely, as a gelatinous precipitate, carbonating said solution to convert the precipitate to granular form, and recovering said chromium hydroxide precipitate.

2. A process for producing chromium hydroxide comprising forming an aqueous solution of sodium chromate, adding sufficient sodium sulphide to precipitate substantially all the chromium present as a gelatinous precipitate of chromium hydroxide, carbonating the solution sufficiently to convert the gelatinous precipitate to a granular form and then separating the granular precipitate.

3. A process for producing sodium chromate comprising roasting a chrome ore with a sodium compound to form sodium chromate, forming an aqueous solution of said sodium chromate, adding sufficient sodium sulphide to said aqueous solution of said chromate to precipitate chromium hydroxide substantially completely as a gelatinous precipitate and form a solution of sodium thiosulphate and sodium hydroxide, treating said solution with carbon dioxide to convert said gelatinous precipitate into granular form and to form sodium carbonate, separating the precipitate by filtration, removing sodium carbonate from the filtrate by fractional crystallization from the sodium thiosulphate, then converting the sodium thiosulphate to sodium sulphide, and returning the sodium sulphide to precipitate additional chromium hydroxide.

4. In a process of producing chromium hydroxide, the steps of roasting a chrome ore with sodium carbonate to form sodium chromate, dissolving said chromate in an aqueous medium, adding sufficient sodium sulphide to said medium to precipitate substantially all chromium as chromium hydroxide and form sodium hydroxide and sodium thiosulphate in said medium, passing carbon dioxide into said medium to form sodium carbonate therein, separating chromium hydroxide from said medium, removing sodium carbonate after crystallization in said medium, and returning the removed sodium carbonate to the aforesaid roasting step, converting sodium carbonate and sodium thiosulphate remaining after removal of said sodium carbonate to sodium sulphite, and returning said sulphide to the aforesaid precipitation step.

5. In a process of producing chromium hydroxide, the steps of roasting a chrome ore with sodium carbonate to form sodium chromate, dissolving said chromate in an aqueous medium, adding sufficient sodium sulphide to said medium to precipitate substantially all chromium as chromium hydroxide and form sodium hydroxide and sodium thiosulphate in said medium, passing carbon dioxide into said medium to form sodium carbonate therein, separating chromium hydroxide from said medium after said carbonation, removing sodium carbonate after crystallization in said medium, and returning the removed sodium carbonate to the aforesaid roasting step, converting sodium carbonate and sodium thiosulphate remaining after removal of said sodium carbonate to sodium sulphide, and returning said sulphide to the aforesaid precipitation step.

6. In a process of producing chromium hydroxide, the steps of roasting a chrome ore to form sodium chromate, dissolving said chromate in an aqueous medium, adding sodium sulphide to said medium to precipitate chromium hydroxide, and form sodium hydroxide and sodim thiosulphate in said medium, passing carbon dioxide into said medium to form sodium carbonate therein, then separating the chromium hydroxide from said medium, removing a portion of the sodium carbonate by crystallization in said medium, converting sodium carbonate and sodium thiosulphate remaining after removal of said sodium carbonate to sodium sulphide, and returning said sulphide to the aforesaid precipitation step.

7. A process of producing chromium hydroxide from a chrome ore containing between 15 per cent and 25 per cent of chromium as chrome oxide in a furnace having a surface supporting the ore roast and impervious to liquid sodium chromate and a liquid sodium chromate-sodium carbonate eutectic, said process comprising the steps of roasting a chrome ore in said furnace with a flux consisting of sodium carbonate to form sodium chromate, dissolving said chromate in an aqueous medium, adding sufficient sodium sulphide to said medium to precipitate substantially all chromium as chromium hydroxide and form sodium hydroxide and sodium thiosulphate in said medium, passing carbon dioxide into said medium to form sodium carbonate therein, separating chromium hydroxide from said medium, removing sodium carbonate after crystalization in said medium, and returning the removed sodium carbonate to the aforesaid roasting step, converting sodium carbonate and sodium thiosulphate remaining after removal of said sodium carbonate to sodium sulphide, and returning said sulphide to the aforesaid precipitation step.

THOMAS PARSONS.

REFERENCES CITED

The following references are of record in the file of this patent:

UNITED STATES PATENTS

| Number | Name | Date |
|---|---|---|
| 2,350,960 | Darrin | June 6, 1944 |
| 2,246,396 | Tarr | June 17, 1941 |
| 1,324,328 | Vis | Dec. 9, 1919 |
| 9,853 | Booth | July 19, 1853 |